United States Patent
Rosa

(10) Patent No.: US 10,408,497 B2
(45) Date of Patent: Sep. 10, 2019

(54) EMERGENT PLATFORM DIFFUSE LIGHT CONCENTRATING COLLECTOR

(71) Applicant: James Rosa, Woodstock, NY (US)

(72) Inventor: James Rosa, Woodstock, NY (US)

( * ) Notice: Subject to any disclaimer, the term of this patent is extended or adjusted under 35 U.S.C. 154(b) by 224 days.

(21) Appl. No.: 15/617,278

(22) Filed: Jun. 8, 2017

(65) Prior Publication Data

US 2017/0356676 A1    Dec. 14, 2017

Related U.S. Application Data

(60) Provisional application No. 62/392,714, filed on Jun. 9, 2016.

(51) Int. Cl.
| | | |
|---|---|---|
| *F24J 2/04* | (2006.01) | |
| *F24S 20/67* | (2018.01) | |
| *G02B 19/00* | (2006.01) | |
| *F24S 23/74* | (2018.01) | |
| *F24S 23/71* | (2018.01) | |
| *F24S 23/70* | (2018.01) | |

(52) U.S. Cl.
CPC ............ *F24S 20/67* (2018.05); *F24S 23/715* (2018.05); *F24S 23/745* (2018.05); *F24S 23/82* (2018.05); *G02B 19/0028* (2013.01); *G02B 19/0042* (2013.01); *Y02B 10/20* (2013.01); *Y02E 10/42* (2013.01); *Y02E 10/44* (2013.01)

(58) Field of Classification Search
CPC ..................................... F24S 20/67
USPC ................................ 126/623, 694
See application file for complete search history.

(56) References Cited

U.S. PATENT DOCUMENTS

| | | | |
|---|---|---|---|
| 3,367,843 A * | 2/1968 | Clive | C02F 1/14 |
| | | | 202/176 |
| 3,923,039 A | 12/1975 | Falbel | |
| 3,946,720 A | 3/1976 | Keyes et al. | |
| 3,946,721 A | 3/1976 | Keyes et al. | |
| 3,946,944 A | 3/1976 | Keyes et al. | |
| 3,957,031 A | 5/1976 | Winston | |
| 3,987,786 A | 10/1976 | Keyes et al. | |
| 4,002,499 A | 1/1977 | Winston | |
| 4,003,638 A | 1/1977 | Winston | |
| 4,088,266 A | 5/1978 | Keyes | |
| 4,114,595 A | 9/1978 | Barker | |
| 4,236,507 A | 12/1980 | Vincent | |
| 4,258,697 A | 3/1981 | Flagg | |
| 4,342,307 A | 8/1982 | Tuck | |
| 4,359,265 A | 11/1982 | Winston | |
| 4,512,333 A | 4/1985 | King | |
| 5,289,356 A | 2/1994 | Winston | |

(Continued)

OTHER PUBLICATIONS

Monika Adsten, "Solar Thermal Collectors at High Latitudes: Design and Performance of Non-Tracking Concentrators," Uppsala University, Sweden (2002).

(Continued)

*Primary Examiner* — Avinash A Savani
(74) *Attorney, Agent, or Firm* — Orrick, Herrington & Sutcliffe LLP; Tyler Scott Miller

(57) ABSTRACT

Radiant energy traps are disclosed which comprise diffuse radiant energy concentrators with at least one reflector and receiver. A diffuse light concentrator (DLC) with optimizable flexibility may be used in multiple applications, such as solar electric, thermal (air or water), hybrid or a combination system.

9 Claims, 6 Drawing Sheets

(56) References Cited

U.S. PATENT DOCUMENTS

| | | | |
|---|---|---|---|
| 5,537,991 | A | 7/1996 | Winston et al. |
| 6,205,998 | B1 | 3/2001 | Winston |
| 6,294,723 | B2 | 9/2001 | Uematsu et al. |
| 8,207,482 | B2 | 6/2012 | Rosa |
| 8,650,813 | B2 | 2/2014 | Botkin et al. |
| 9,196,755 | B2 | 11/2015 | Wildes |
| 9,309,910 | B2 | 4/2016 | Anderson et al. |
| 9,479,110 | B2 | 10/2016 | Patton et al. |
| 9,571,031 | B2 | 2/2017 | Cavieres et al. |
| 9,628,019 | B1 | 4/2017 | Atcha et al. |
| 2002/0170555 | A1* | 11/2002 | Stoumen et al. ....... E04H 15/40 126/682 |
| 2010/0043779 | A1* | 2/2010 | Ingram ................... F24S 40/20 126/694 |
| 2010/0186733 | A1* | 7/2010 | Hoefler ................ F24S 23/715 126/625 |
| 2010/0243019 | A1 | 9/2010 | Larsson |
| 2011/0108091 | A1* | 5/2011 | Wylie ................... F24S 30/425 136/246 |
| 2013/0233371 | A1* | 9/2013 | Rodin ................... H02S 30/20 136/245 |

OTHER PUBLICATIONS

Simon Furbo, Louise Jivan Shah, Ulrike Jordan, "Solar Energy: State of the Art," Tech. Univ. of Denmark (Jul. 2003).

\* cited by examiner

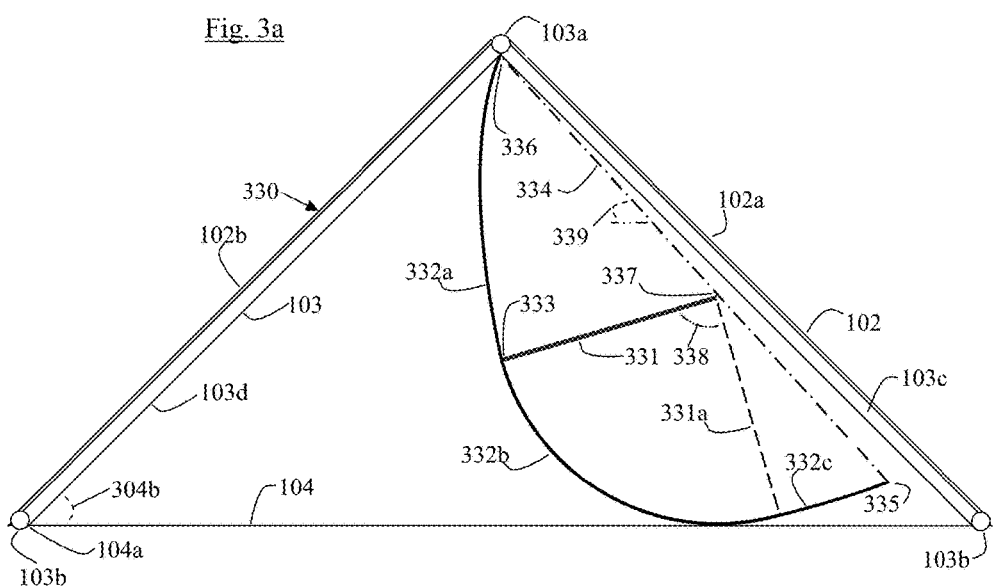
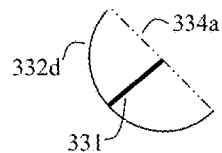
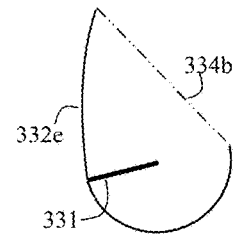
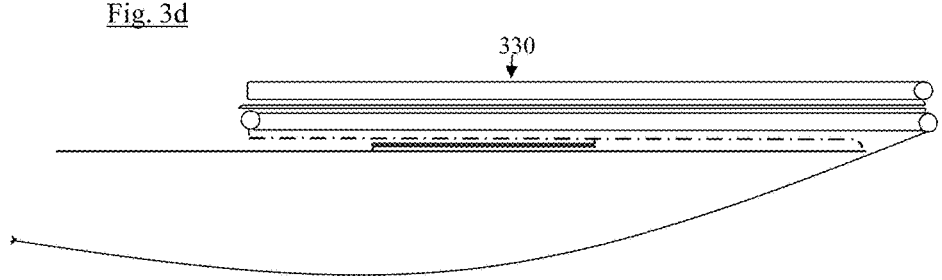

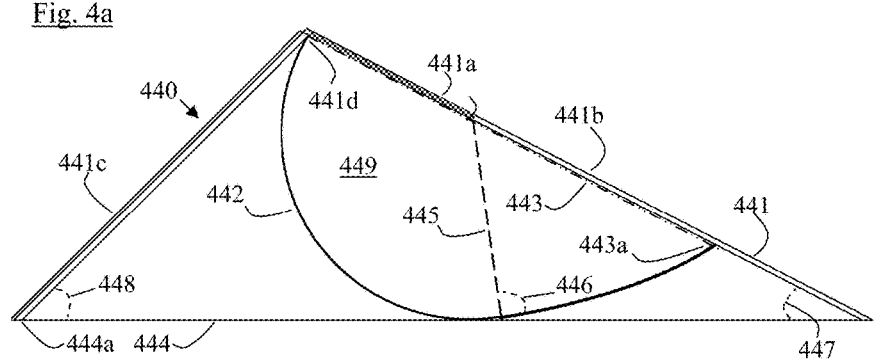
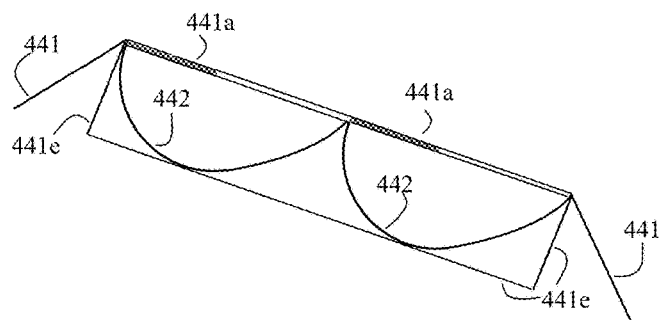
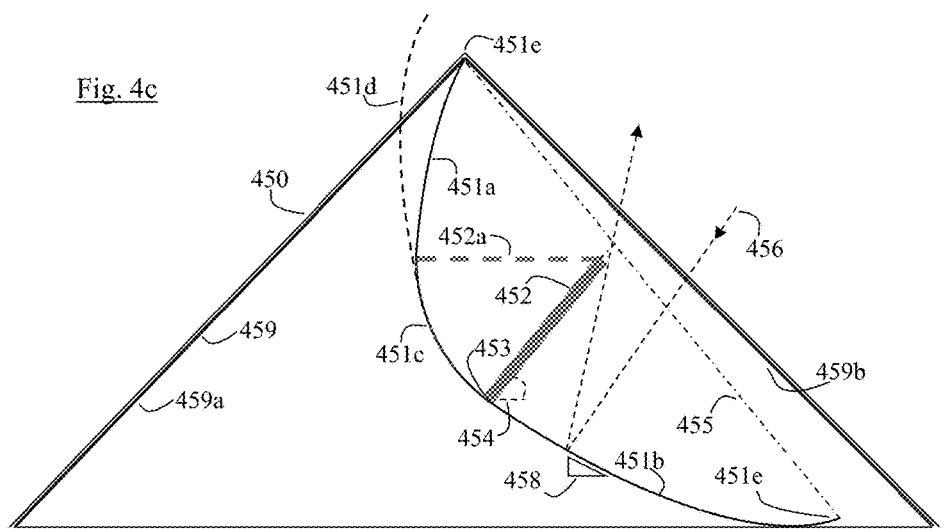

EMERGENT PLATFORM DIFFUSE LIGHT CONCENTRATING COLLECTOR

RELATED APPLICATIONS

This application claims the benefit of the filing date of U.S. Provisional Application Ser. No. 62/392,207, filed Jun. 9, 2016, entitled "Emergent Platform Diffuse Light Concentrating Collector," the entirety of which provisional application is incorporated by reference herein.

FIELD OF THE INVENTION

The invention relates to the field of solar energy. More particularly, the invention relates to radiant energy traps and diffuse light concentrating solar collectors.

BACKGROUND OF THE INVENTION

Parabolic concentrators must track the sun and do not collect diffuse light, which can be up to 40% of the available light. Diffuse light concentrating (DLC) type or compound parabolic concentrator (CPC) type collectors potentially increase collector efficiency and reduce the receiver's size and cost by the aperture/receiver ratio or concentration factor, reducing a thermal receiver's heat loss area. However, current designs have poor optical and or thermal performance and require costly and complex manufacturing and materials and or use nonstandard Photovoltaic (PV) cell size, often configured so that frame elements shade PV cells that in turn shut off a line of connected cells.

U.S. Pat. No. 3,923,039 to Falbel described a radiant energy trap with a "plate" receiver. Falbel's receiver does not take full advantage of a bifacial receiver and uses a "scoop" reflector with first and second merging curves formed by respective radii of curvature. The concept of a parabolic second curve is shown in Winston's patents, such as U.S. Pat. Nos. 3,957,031, 4,002,499, 4,003,638, 4,359,265, 5,289,356, 5,537,991, and 6,205,998. The collectors disclosed in the Winston patents are variations on the classic CPC, which suffer from a high (expensive) ratio of reflector curve length to aperture length, having monofacial, bifacial or circular cross-section receivers, where the first curvature accommodates the receiver shape in various ways.

U.S. Pat. No. 6,294,723 to Uematsu sought to increase the angle of acceptance of radiant energy by using a refractor, within which is a bifacial receiver and reflector having a first round curvature and second flat reflector section. The refractor made the collector complicated and expensive to manufacture, without taking full advantage of a bifacial planar receiver.

The author's U.S. Pat. No. 8,207,482 takes full advantage of a bifacial receiver, within a reduced size, heat loss and cost refractor with an external reflector having a reduced reflector curved length to aperture length, but it is still somewhat complicated and expensive to manufacture.

DLC type collectors can be designed to be seasonally load adapted (SLA), which reduces off heating season collector overheating by shaping the reflector to cut off part of the reflected light to the receiver, due to a seasonal increase in the sun's altitude above the horizon. This is discussed in Adsten's 2002 Uppsala University thesis ("Solar Collectors at High Latitudes"), Furbo, Shah and Jordan's 2003 Technical University of Denmark report ("Solar Energy: State of the Art"), and U.S. Patent Publication No. 2010/0243019 to Larsson (mentioned as a hot water and or PV cell solar collector).

An SLA collector for heating buildings can have a relatively small angle of acceptance of radiant energy, which can increase concentration (efficiency). A collector designed for heating buildings allows for a lower collector operating temperature than for heating hot water, which reduces heat loss, but still allows for hot water pre-heat, which is what most hot water collector systems really do. Hot air collectors can avoid heat exchanger system loss by directly heating the air in a building. Overheated air is potentially less of a problem than overheated water. An SLA hot air collector could potentially allow systems to be designed for more than 50-60% annual heat load. On a volume basis, water transfers over 3000 times more heat than air. For this reason, existing flat panel hot air collectors, such as those described in U.S. Pat. No. 4,512,333 to King, U.S. Pat. No. 4,342,307 to Tuck, and U.S. Pat. No. 4,258,697 to Flagg, need the entire aperture area for their mono-facial receiver, with turbulent flow baffles or the like, to achieve a modicum of heat transfer. For this reason, existing hot air collectors have not been able to satisfy the design needs of DLC type collectors with reduced size receivers.

Conventional collector mounting systems patents, such as those described in U.S. Pat. No. 9,628,019 to Atcha, U.S. Pat. No. 9,571,031 to Cavieres, U.S. Pat. No. 9,479,110 to Patton, U.S. Pat. No. 9,309,910 to Anderson, U.S. Pat. No. 9,196,755 to Wildes, and U.S. Pat. No. 8,650,813 to Botkin mention the use of near vertical wind deflectors at the back side of the collector as part of a collector mounting system, to reduce back side wind lift, for low tilt angle (3° to 20°) solar electric panels. However, high tilt angle building heating collectors need more wind protection and may need to spread their roof load over a significantly wider area.

SUMMARY OF THE INVENTION

This disclosure details the implementation of radiant energy traps with optimizable flexibility for multiple applications. The disclosed radiant energy trap DLC embodiments can be solar electric, thermal (water or air), hybrid or a combination system.

Radiant energy trap DLC embodiments that have at least one curved reflector and a receiver are disclosed. The receiver s positioned to be incident with radiant energy reflected off the curved reflector at at least one angle of acceptance (AOA). In one embodiment, the reflector contains three transverse curved sections. The receiver includes multiple contiguous longitudinal planes.

In a further embodiment, the receiver is a longitudinal duct.

In a further embodiment, the longitudinal duct is positioned so that there is a gap between the at least one longitudinal duct and the reflector.

In a further embodiment, the transverse cross-sectional edge length of the longitudinal duct is longer then the transverse cross-sectional perimeter of the receiver.

In a further embodiment, the radiant energy trap includes a reflector containing a curved section, a receiver, a frame with a front and back side that are tilted at substantially similar angles, and an envelope that encompasses the reflector, receiver and frame.

In a further embodiment, the radiant energy trap includes a reflector containing a curved section, a receiver, a foldable frame, and an envelope that encompasses the reflector, receiver and frame. The reflector and receiver are collapsible.

BRIEF DESCRIPTION OF THE DRAWINGS

The accompanying drawings illustrate various non-limiting, inventive aspects in accordance with the present disclosure.

FIGS. 3A and 3D are transverse cross-sectional views of an embodiment of the invention.

FIG. 3B is a transverse cross-sectional view of a prior art reflector curve.

FIG. 3C is a transverse cross-sectional view of an alternative reflector curve.

FIGS. 4A, 4B, and 4C are transverse cross-sectional views of embodiments of the invention.

DETAILED DESCRIPTION OF THE PREFERRED EMBODIMENTS

Figure 1A:
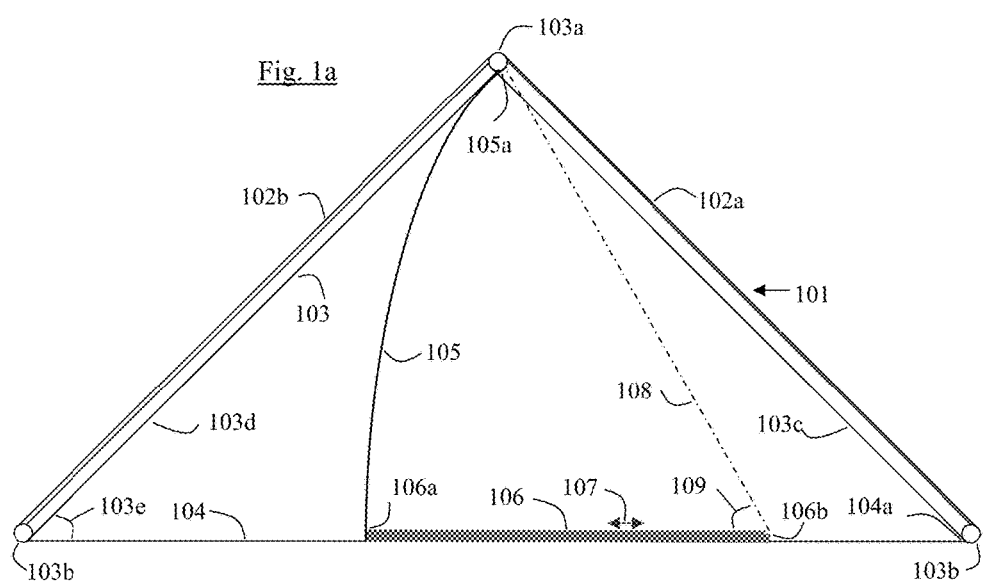
FIGS. 1A and 1B are views of an emergent platform DLC collector embodiment of the invention.

Embodiments of the invention feature a reflector cross-section that comprises a substantially parabolic section with an adjacent mono-facial receiver. The receiver is positioned to be incident with radiant energy reflected off the reflector, which is shaped for angle of acceptance (AOA) and concentration of diffuse and direct light, specific to the application. A planar projection of the reflective surface and receiver comprise the aperture. The aperture to receiver proportion is the concentration ratio (CR). At least one reflector longitudinal edge is constrained by a frame. The frame supports the reflector and receiver. The frame supports an envelope. The envelope encompasses the reflector and receiver and is transparent over the aperture. In one aspect of the invention, the reflector comprises at least one substantially parabolic cross-section, plus a substantially circular cross-section for a bifacial receiver. The reflector comprises, such as, a specular reflective film supported by brackets or a silvered 8 to 20 mil flexible aluminum sheet constrained by the frame, using conventional means, and naturally shaped by the stiffness of the aluminum substrate. The reflector can be attached with hinges for folding or field adjustment. The reflector shape and orientation is CR-AOA optimizable for solar electric, thermal, hybrid application, seasonal load adaptation, transverse two-point restraint, higher un-shaded collector array packing density, roof slope accommodation and for seasonal tilt adjustment. The reflector can be composed of non-weather-able lower cost materials.

According to another aspect of the invention, the frame comprises members, such as aluminum or plastic tube, pipe or angle secured by conventional means and for securing glazing or plastic film. A trussed frame comprises, such as, a bottom cord of paracord or polypropylene strap, which can also be attached to the reflector or receiver for alignment and or for ballast and be detached for folding or rollup of a collector.

According to another aspect of the invention, collector wind load can be reduced with an aerodynamic envelope. Collector dead load can be reduced by spreading the load over a wider area, which is particularly important for flat roof ballasted (weighted) collector installations, otherwise ballast block weight could easily exceed building code load limits. The frame's front side, or transverse aperture side, can be tilted at an angle similar to the tilt of the frame's back side supports, with both covered by an envelope that is transparent over the aperture. With a similar back side tilt the wind loading is symmetrical enough so that the back side ballast weight can be the same or similar to the front side ballast weight, but it is not tilted up enough to exceed the front side ballast weight by an amount that would exceed building code roof load limits. Decreasing the back side tilt much beyond the front side tilt spreads the collector roof load with diminishing returns as the front side tilt becomes the dominant wind load factor. Decreasing the back side tilt increases the back side length and area, which increases the cost of the frame and envelope, and the space required for the placement of the next row back of collectors.

According to another aspect of the invention, an envelope comprises glazing or weatherable plastic film, such as, FEP, ETFE, or UV resistant PVC, transparent at least over the aperture and woven HDPE not over the aperture, secured by conventional means. The envelope comprises, such as, linear adjacent sections or a continuous curve. The envelope reduces wind load ballast requirements and snow cover. The envelope prevents the elements from weathering or adversely affecting the receiver, the reflector and its shape. The envelope can enclose, such as, duct, pipe or ballast. It can be vented in the summer with forced or natural cooling.

Mono-facial receiver embodiments can comprise geometry that reduces heat loss by: the CR reducing the receiver's heat loss area, a relatively large air space between envelope and receiver, the receiver's back flat on a roof and additional roof area within the envelope. The mono-facial receiver collector can have, such as, a CR=1⅓ with a reflector to aperture proportion $(R_L/A_P)=0.9$ and a summer load adaptation of CR=1.

In one embodiment, the mono-facial receiver's reflector can be truncated by tilting the receiver's adjacent edge up from the bottom of the reflector's curvature. A tilt adjustment of 15° could be useful for a low slope roof. By retilting the receiver, integrated with the reflector, horizontally; the AOA is repositioned 15° above the horizon (losing a negligible amount of annual sunlight). This and increasing the reflector's upper end curvature beyond the ideal parabolic shape can provide two reflection opportunities for lighting up a PV receiver section that may otherwise be shaded from direct light. An additional 10° receiver tilt can be taken with minor optical loss, reducing $R_L/A_P=0.62$. Truncating the reflector in this way reduces the collector height or wind load (ballast weight), collector array spacing and reflector cost.

The reflector's stiffness can maintain curvature with just transverse end attachment. Material cost can be minimized with a vinyl film envelope, solvent welded to a simply curved frame of PVC pipe. For transport, collector components could lie flat and be rolled up. A transverse cross-section flexible frame such as PVC pipe can be configured upon installation, being curved in a bow like shape with orthogonal attachment points that hold the receiver and reflector in proper positions, with pipe ends secured by a detachable strap or cord.

The envelope can be extended to be bonded (minimal weight) to a roof. The strap or cord can be extended and tied to external ballast on a roof. Envelope end caps can be configured by frame half curves. The receiver can be a common PV panel. Air blown under the receiver would remove heat. This could be the lowest cost version of a hybrid PV-thermal air collector having a simpler aerodynamic frame shape than the previous embodiment.

In another embodiment, a bifacial receiver emergent platform DLC comprises a reflector shaped by the reflector's stiffness and being simply constrained by strap or cord, periodically attached to opposed reflector and nonadjacent receiver longitudinal edge points and to a frame. The reflector has a parabolic, circular and linear section. The bifacial receiver reflector's substantially circular cross-section, end section, can be allowed to straighten, due to the substrate's stiffness, when constrained as described, which increases CR-AOA. This is suitable for hybrid PVT application with the AOA starting at, for example, 15° above the horizon with 47° aperture tilt. With a common or standard width reflector, the bifacial receiver comprises two longitudinal rows of encapsulated standard size bifacial PV cells with a secondary gapped cover forming a longitudinal duct with, such as, a PV transparent near IR absorption, far IR reflecting film for air, or glass sheet ducting an IR absorbing thickness of water based heat transfer fluid. The receiver can comprise bifacial evacuated tubes to maximize thermal efficiency and high temperature output while minimizing the number of tubes required. The envelope can be bonded (minimal weight) to a roof or the straps or cord used to secure ballast or both. Installation cost can be minimal with an air collector simply unfolded, configured, secured and ducted to a rooftop-heating unit (RTHU). Roll-able or foldable PV panels can also be used as a receiver.

In another embodiment, the bifacial PV receiver emergent platform DLC collector allows for functional integration and performance/cost optimization as a low tilt PV collector with integrated envelope-frame and encapsulated PV receiver, with the weight of the glazing as ballast. The frame is foldable and the reflector and receiver are collapsible. Structural glass eliminates frame shading of the PV cells. The junction of the envelope sections and reflector edge can be hinged for foldability. A duct is formed by the reflector and glazing, which can be vented to the environment or forced air cooled as fresh air preheat for an RTHU and to increase PV cell efficiency. PV cell waste heat in the envelope can help snow slide off the glazing even with a low tilt angle. A relatively large footprint aerodynamic envelope can provide minimal lbs./sq. Ft. on, such as, a low load big box store flat roof. A reduced scale and/or linked multiple transverse receiver-reflector sections would minimize the depth of the collector to reduce the profile for a more desirable look on a sloped roof residence.

In another embodiment, the bifacial receiver emergent platform DLC comprises a reflector shape and orientation that maximizes thermal output while being seasonally load adapted to reduce off heating season solar collection by two thirds. This is achieved by shaping and orienting the reflector to cut off a reflector section's light reflection to the receiver at an angle, such as 50° above the horizon. In the northeastern U.S.A., a sun angle greater than 50° occurs from approximately April through September, which reduces summer CR to one. The remaining heat can be vented or used for potable hot water heating. It would be a simple matter for this embodiment to accept a stagnation condition as an air collector. With load adaptation and a lower installed cost/ft.$^2$ W annual solar heat load could be increased to 80%, versus 50% for a typical installation. The DLC collector efficiency is increased and reflector cost reduced for the AOA because the reflector shape maximizes CR and minimizes $R_L/A_P$. Compared to a half-round reflector, CR=2, $R_L/A_P$=1.57 or for an optimized 60° tilt aperture, CR=2.7, $R_L/A_P$=2.1, this embodiment can achieve a CR=3½, with a summer CR of one and $R_L/A_P$=1¼. For this embodiment, heat loss can be one third of a flat panel collector's heat loss and can replace low heat loss, but more expensive evacuated tube collectors. Higher light intensity on the receiver further increases efficiency. The receiver can be in contact with the reflector or can be positioned so that there is a gap between the reflector and the receiver. A gap prevents the heat of the receiver from affecting the reflector surface. It reduces the size of the receiver relative to the aperture, which increases CR and reduces heat loss. A relatively small gap and the receiver's width keeps the amount of reflected light that will pass through the gap and bypass the receiver to a minimum.

Conventional DLC collectors continue to require costly and complicated system installation, retrofit and maintenance. The next generation of collectors needs to address these problems, such as by the invention of a relatively simple, high heat transfer, low loss, ducted receiver for a hot air DLC solar collector.

In another embodiment, the bifacial receiver emergent platform DLC reflector shapes can be duals of one another. When constrained by periodically placed longitudinally spaced strap or cord along the aperture, the reflector's curvature can appropriately adjust by changing the aperture's tilt angle due to the stiffness of the reflector's aluminum substrate. The collector can have a higher CR with its tilt adjusted twice yearly to better align with the sun's seasonal position. This can reduce PV collector cost and thermal loss with a reduced wind load.

Figure 1B:
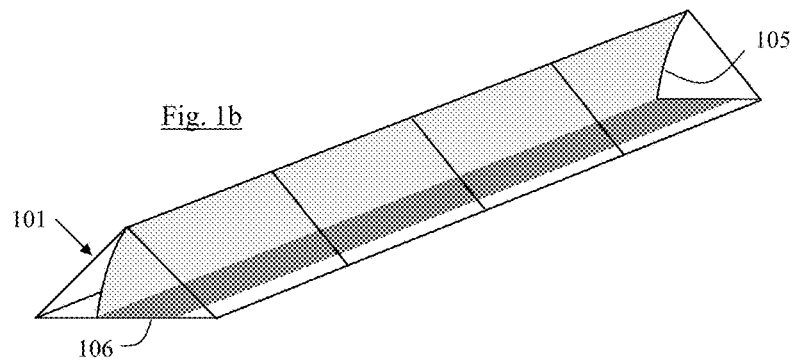

FIG. 1 shows an embodiment of an emergent platform DLC collector. FIG. 1a is a transverse cross-section. The collector 101 includes an envelope 102 that has a transparent side 102a located on the front (aperture) side of the collector. The envelope also has a not necessarily transparent side 102b located on the back side of the collector. The envelope 102 encompasses and is supported by a longitudinally periodic A-frame 103 that comprises longitudinal upper members 103a and paired lower members 103b, forming a simple truss with bottom cord 104, with such as a detachable end 104a. The transverse front frame member 103c and back frame member 103d are connected by way of frame upper member 103a. The frame upper member 103a and a substantially parabolic cross-section reflector 105 junction along longitudinal edges 105a at an angle selected to affect the shape of the reflector 105. The reflector 105 and monofacial receiver 106 junction along longitudinal edges 106a by a detachable or hinged means for collapsing purposes. The horizontal position of the receiver 107 can be selected to affect the shape of the reflector 105. The receiver's opposing end 106b and reflector A-frame junction 105a form a virtual line aperture 108. The aperture 108 is tilted at an angle 109, such as 60° for solar thermal. A 60° angle 109 would give an ideal CR=1⅓ and RL/Ap=0.9 approximately. The bottom cord 104 can be attached to the receiver 106 by conventional means to set its horizontal position 107. A-frame 103 can comprise back side frame supports 103d that are tilted at an angle similar to the frame's front side supports 103c, or transverse aperture side, tilt, so that the back side wind load is similar to the front side wind load. 103d is tilted at angle 103e. If angle 103e is an angle such as 45°, this reduces wind load ballast requirements compared to an unenclosed reflector 105 with aperture tilt angle 109 of 60°. A-frame 103 supports envelope 102. FIG. 1b is a perspective view of a length of the FIG. 1a collector 101 with reflector 105 and receiver 106.

Figure 2A:
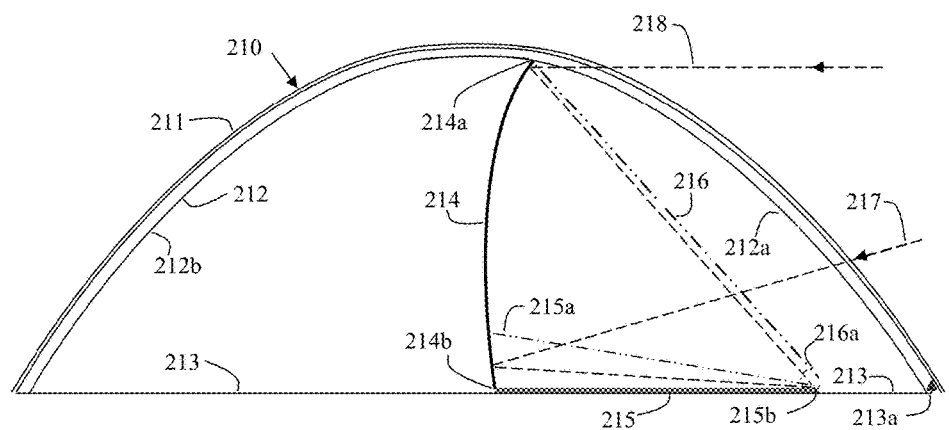
FIGS. 2A, 2B, and 2C are transverse cross-sectional views of an embodiment of the invention.

FIG. 2 shows transverse cross-sectional views of an emergent platform DLC collector embodiment of the invention that is collapsible and can be rolled up or folded for transport and then unfurled and configured onsite. In, FIG.

2a, collector 210 comprises a transparent plastic film envelope 211 over a flexible curved frame 212, configured by a bottom cord 213 that is detachable 213a. The frame 212 is attached to a hinged longitudinal reflector edge 214a. The reflector 214 and mono-facial receiver 215 are hinged at mutual longitudinal edges 214b. Envelope 211 encompasses reflector 214 and receiver 215. The receiver 215 is attached to the bottom cord 213 or is tilted up 10° more as the dashed line 215a for further reflector truncation and or placement on a tilted roof. Compared to the embodiment in FIG. 1, the truncated reflector 214 creates an aperture 216 with a lower tilt angle 216a, such as 47°, optimized for PVT application. The quasi-parabolic shape of the reflector 214 is revealed by two light rays 217 and 218 directed at different angles but reflected off the reflector 214 to arrive at the same location 215b on receiver 215. Frame 212 transverse aperture side or front side 212a can be tilted at an angle similar to frame back side 212b so that the back side wind load is similar to the front side wind load. Frame 212 supports envelope 211. Envelope 211 encompasses reflector 214 and receiver 215.

Figure 2B:
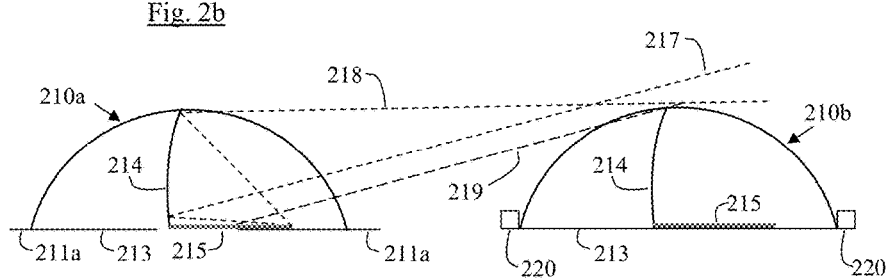

FIG. 2b shows two rows of collectors 210a and 210b. But for the shape of reflector 214, the collector 210a receiver 215 would normally be shaded by collector 210b below line 219. Partial shading of a PV receiver can shut down an entire panel. Light rays 217 and 218 are reflected by reflector 214 to deliver sunlight to the otherwise shaded portion, which prevents shutdown and allows for higher array packing density. Exterior ballast blocks 220 can be tied to bottom cord 213 or laid on envelope extensions 211a. Envelope extensions can be bonded to appropriate roof material for ballast.

Figure 2C:
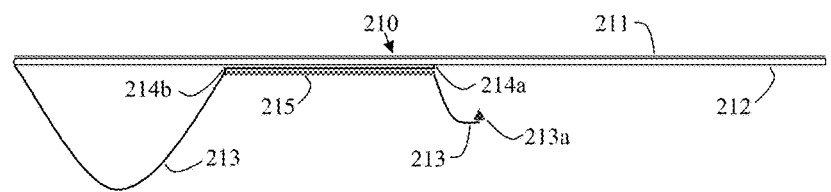

Collector 210 can be collapsed and folded. FIG. 2c shows a flattened, collapsed and folded, preconfigured collector 210 that comprises envelope 211, frame 212, bottom cord 213 with detachable point 213a, reflector hinges 214a and 214b, and receiver 215.

FIG. 3 shows transverse cross-sectional views of an emergent platform DLC bifacial receiver embodiment. In FIG. 3a, collector 330 comprises an envelope 102, with a transparent section 102a located on the front (aperture) side of the collector and not necessarily transparent section 102b located on the back side of the collector, A-frame 103 that comprises longitudinal upper members 103a and paired lower members 103b, truss bottom cord 104 with detachable end 104a, bifacial receiver 331 and reflector 332. Reflector 332 comprises sections that are substantially parabolic 332a and circular 332b, with end part 332c straightening out. Bifacial receiver 331 is positioned orthogonally adjacent as a radius to the substantially circular reflector section 332b as the junction of a longitudinal edge and line respectively 333. The aperture 334 and reflector circular section end part 332c are adjacent along a longitudinal line and edge 335 respectively. The aperture 334 and reflector substantially parabolic section 332a are adjacent along longitudinal line and edge 336 respectively, along with the top A-frame member 103a. The reflector 332 is supported along longitudinal edges 336 and 335 that support the reflector shape. The reflector 332 is supported longitudinally to maintain the reflector's angles of acceptance. The longitudinal support can be the truss bottom cord 104 (and mounting surface). The receiver 331 and aperture 334 are adjacent at the receiver's radial focal point 337 along a longitudinal edge and line respectively. Arc 338 subtends the reflector's circular section 332b, over which the receiver 331 can be radially positioned up to virtual line 331a. The AOA of this reflector-receiver configuration can be from the horizon up to the tilt of virtual line 331a. The aperture 334 comprises longitudinally periodically positioned straps or cords attached at adjacent points 335, 336, and 337. A-frame 103 and truss bottom cord 104 subtend a tilt angle 304b, such as 45°. Aperture 334 is tilted at an angle to the horizontal 339, such as 47°. A-frame 103 can comprise back side supports 103d that are tilted at an angle similar to the frame's front side 103c, or transverse aperture side, tilt, so that back side wind load is similar to front side wind load. A-frame 103 supports envelope 102.

FIGS. 3b and 3c comprise proportional drawings of DLC reflector shapes to demonstrate the more effective reflector of FIG. 3a, which has a lower $R_L/Ap$ and higher CR=Ap/Ab of approximately 1.3 and 2.6 respectively. This is compared to the half round reflector 332d of FIG. 3b with aperture 334a and half round with the parabolic extension reflector 332e of FIG. 3c with aperture 334b and receivers 331 as proportions of $R_L/Ap$=1.57 and 2.1 and CR=Ap/Ab of 2 and 2.6 respectively. Envelope 102 encompasses reflector 332 and receiver 331. A-frame 103 is foldable, and reflector 332 and receiver 331 are collapsible. FIG. 3d shows an unconfigured, collapsed and folded collector 330 of FIG. 3a.

FIG. 4 shows transverse cross-sectional views of emergent platform DLC transverse cross-section bifacial receiver embodiments. FIG. 4a shows a low tilt angle, low wind load, primarily PV collector 440 with an integrated envelope-frame-receiver 441 that comprises an encapsulated bifacial PV cell receiver section 441a within a transparent glazing 441b, which is located on the front (aperture) side of the collector and attached to a not necessarily transparent section 441c, located on the back side of the collector, via junction 441d. A quasi-circular-parabolic reflector 442 is configured by aperture 443, which comprises a longitudinally periodic strap or cord with detachable point 443a and opposite end attachment, at junction 441d. Envelope-frame-receiver 441 encompasses reflector 442. The reflector is supported along longitudinal edges that support the reflector shape. The reflector is supported by a longitudinal support. The longitudinal support is positioned to maintain the reflector's angles of acceptance. The longitudinal support can be the mounting surface and or longitudinally periodic bottom truss cords 444. Bottom truss cord 444 with detachable end 444a configures the envelope-frame-receiver 441. The not necessarily transparent section 441c can comprise plastic film, weatherable hardboard or glazing. A maximal weight envelope-frame-receiver 441 can serve as internal ballast. Line 445 demarks the maximum angle 446 over which accepted light is reflected by reflector 442 to, such as bifacial PV cell, receiver 441a. The AOA of this configuration is from the tilt of the aperture 443 up to the tilt of line 445. The aperture 443 comprises a relatively low tilt angle 447 such as 27°. The not necessarily transparent section 441c comprises a tilt angle 448 such as 45°. Envelope-frame-receiver 441 is foldable, and reflector 442 is collapsible and collector 440 can be folded up for transport when cord or strap 443 and 444 are detached at 443a and 444a respectively. Junction 441d comprises a hinge. The transparent glazing 441b and reflector 442 comprise a longitudinal duct 449 for airflow, to cool the bifacial PV cell receiver 441a, which could be used to preheat a building's intake of fresh air.

FIG. 4b shows an emergent platform DLC embodiment of more than one reflector 442 and receiver 441a from FIG. 4a, with a scaled down integrated envelope-frame-receiver 441, to minimize collector depth for sloped roofs, with frame members 441e enclosing the reflectors 442.

FIG. 4c shows a transverse cross-section of an emergent platform DLC embodiment oriented and configured to be seasonally load adapted. Envelope 450 encompasses substantially parabolic reflector sections 451a and 451b and circular reflector section 451c. Reflector section 451a is adjacent to reflector section 451c and reflector section 451c is adjacent to reflector section 451b. Envelope 450 encompasses receiver 452, which is adjacent to reflector section 451c at any point along its arc from position 452a to junction 453. Reflector section 451a is shaped and positioned relative to the receiver 453 so that its AOA starts at the horizon or horizontal, represented by the dotted line 452a. Alternative reflector section 451d replaces 451a to increase CR by tilting the start of this section's AOA above the horizontal 452a. Reflector section 451d has an AOA comprising an arc starting from an angle and arcing away from an angle above the horizontal 452a. The reflector is supported along longitudinal edges 451e that support the reflector shape. The reflector is supported by a longitudinal support 458. The longitudinal support 458 supports reflector section 451b. The longitudinal support 458 is positioned to maintain the reflector's angles of acceptance. The envelope 450 is supported by a frame 459. Frame 459 can comprise back side supports 459a that are tilted at an angle similar to the frame's front side, or transverse aperture side, supports 459b so that back side wind load is similar to front side wind load.

The receiver 452 at junction 453 creates an angle to the horizontal 454 and represents the highest sun angle that light reflecting from reflector section 451b will reach receiver 452. Reflector section 451b has an AOA comprising an arc starting from an angle above the horizontal and arcing toward the horizontal. A non-heating season sun light ray 456 is shown tilted at a large enough angle to miss receiver 452.

Receiver 452 is shown having a width. The receiver 452 comprises multiple contiguous longitudinal planes, and can be an air duct. The receiver can also comprise fin tubes, PV cells, or a hybrid combination. Aperture 455 corresponds to reflector section 451a. The aperture would be extended for alternate reflector section 451d.

Figure 5:
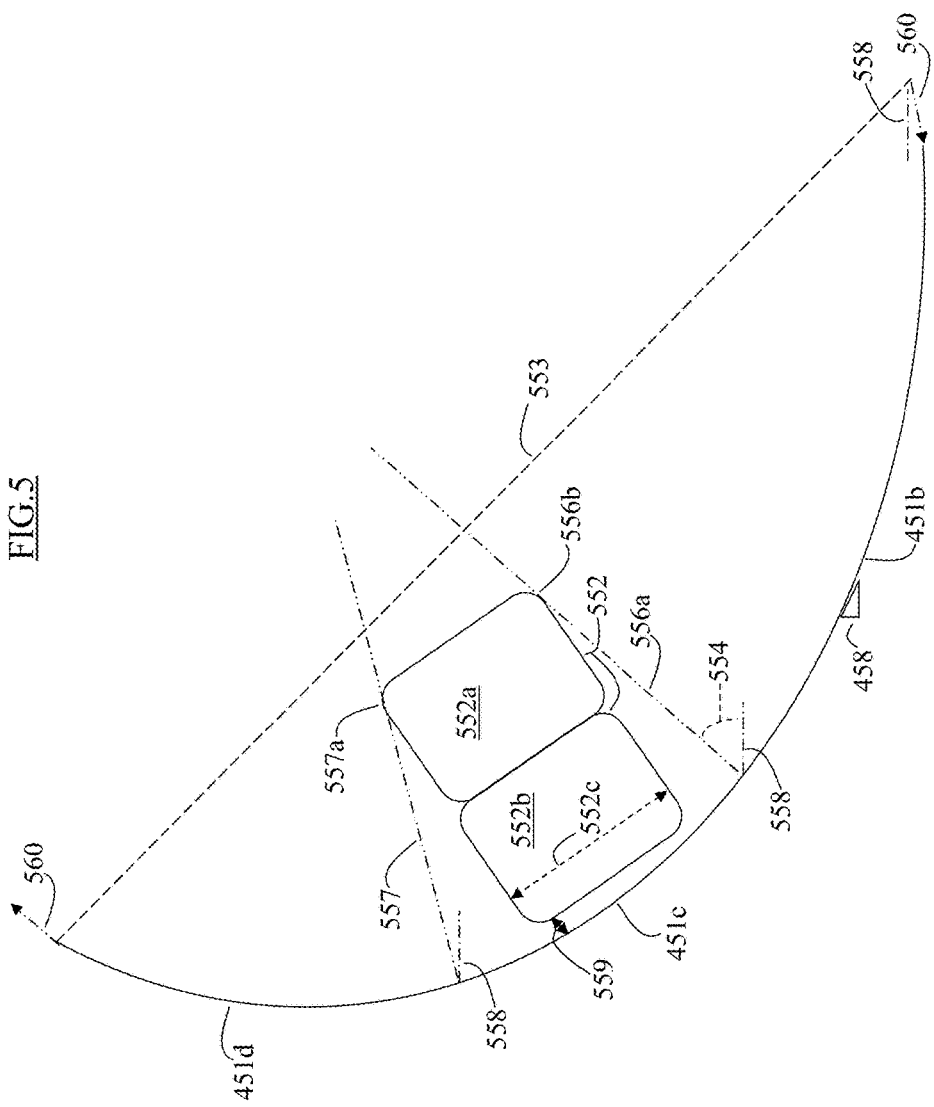
FIG. 5 is a transverse cross-sectional view of an embodiment of the invention.

FIG. 5 shows a transverse cross-section embodiment of FIG. 4c with curved alternate reflector section 451d, corresponding receiver sections 552a and 552b having a width 552c and aperture 553. The receiver 552 comprises multiple contiguous longitudinal planes. The angle of acceptance of reflector section 451d starts with ray 557 at an angle above the horizontal 558, tangent 557a to the upper edge of receiver section 552b. The angle of acceptance of curved reflector section 451b starts with ray 556a at angle 554 from the horizontal 558. Angle 554 represents the highest sun angle of ray 556a, tangent 556b to the lower edge of the receiver section 552b, that intercepts receiver section 552b. The angle of acceptance of reflector section 451d comprises an arc that starts from an angle above the horizontal and arcs away from the horizontal. Reflector section 451c is contiguous with reflector section 451d. Reflector section 451b is contiguous with reflector section 451c. The angle of acceptance of reflector section 451b comprises an arc that starts from an angle above the horizontal and arcs toward the horizontal. Receiver 552 is shown as a pair of ducts 552a and 552b that together comprise an air collector receiver. The edge length of ducts 552a and 552b can be longer than the receiver 552 perimeter. The receiver 552 can be in contact with the reflector 451 or can be positioned so that there is a gap 559 between the reflector and the receiver. A gap 559 prevents the heat of the receiver from affecting the reflector surface. It reduces the size of the receiver relative to the aperture, which increases CR and reduces heat loss. A relatively small gap 559 and the receiver's width 552c keeps the amount of reflected light that will pass through the gap and bypass the receiver 552 to a minimum. Aperture 553 increases the CR relative to FIG. 4c aperture 455. The reflector 552 end positions can be correspondingly shifted, as indicated by arrows 560, to change the aperture tilt relative to the horizontal 558. The reflector 451 can be supported along longitudinal edges that support the reflector shape. The reflector is supported by a longitudinal support 458 The longitudinal support 458 supports reflector section 451b. Due to its weight, the shape of a flexible reflector requires more support. The longitudinal support 458 is positioned to maintain the reflector's angles of acceptance. FIG. 5 can be utilized in a collector that also comprises an envelope and frame such as FIG. 4b or 4c.

Figure 6A:
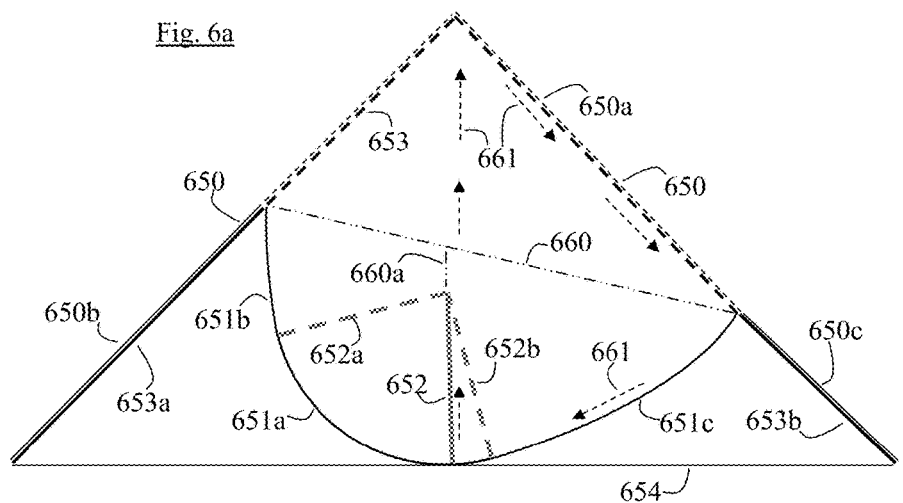
FIGS. 6A and 6B are transverse cross-sectional views of embodiments of the invention.

FIG. 6 shows transverse cross-sectional views of emergent platform DLC bifacial receiver embodiments. In FIG. 6a, envelope 650 encompasses receiver 652 and substantially circular reflector section 651a, between the arc of lines 652a and 652b, and parabolic reflector sections 651b and 651c. The upper parabolic reflector section 651b is tilted so that the AOA starts and arcs above the horizon, such as by 15°, as indicated by the possible bifacial receiver limit position 652a. The lower parabolic reflector section 651c is tilted so that the AOA starts and arcs below, such as 105° above the horizon, indicated by the possible bifacial receiver position limit 652b. With the AOA's suggested, CR=2.8. The reflector 651 and receiver 652 are constrained by transverse, longitudinally periodic, straps or cords (aperture) 660 and 660a. Vertical orientation of the receiver 652 optimizes convective cooling indicated by flow arrows 661. The envelope 650 can be triangular or the dashed lines of envelope section 650a truncated to be parallel adjacent aperture 660, continuous with the rest of the envelope 650b and 650c. This would reduce wind loading. The reflector 651 is supported along longitudinal edges that support the reflector shape. The reflector 651 is supported by a longitudinal support positioned to maintain the reflector's angles of acceptance. The longitudinal support can be the mounting surface. Envelope 650 can be supported by frame 653, which can comprise back side supports 653a that are tilted at an angle similar to the frame's front side 653b, or transverse aperture side, tilt, so that the back side wind load is similar to the front side wind load. Frame 653 is held by bottom cord 654.

Figure 6B:
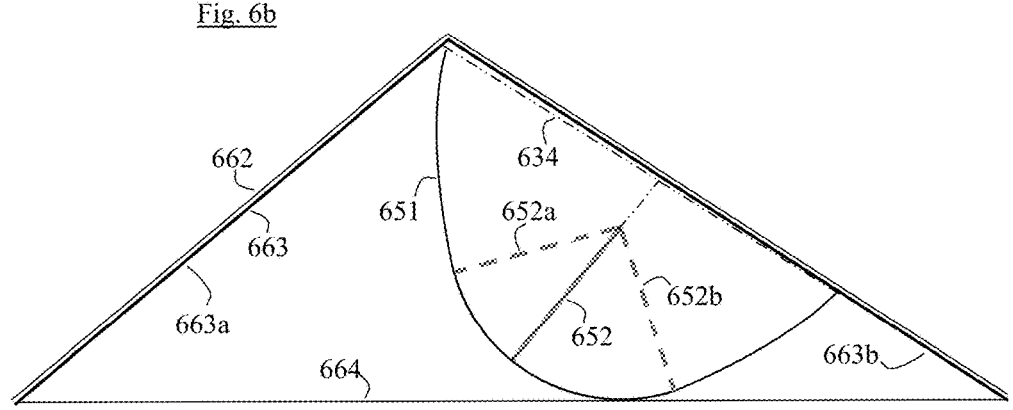

FIG. 6b shows an emergent platform DLC bifacial receiver embodiment with the same CR as the embodiment shown in FIG. 6a. Reflector 651 has the same edge length as in FIG. 6a but is shaped to optimize a collector with a hybrid PVT receiver that provides more electric output than heat. When aperture 634 is retilted from the configuration shown in FIG. 6a to that of FIG. 6b, biannually, in order to maximize annual output, the AOAs shown in FIG. 6a are maintained, as indicated by lines 652a and 652b. The reflector 651 naturally reshapes itself for the new aperture tilt. Envelope 662 is supported by frame 663. Frame 663 can comprise back side supports 663a that are tilted at an angle similar to the frame's front side 663b, or transverse aperture side, tilt, so that the back side wind load is similar to the front side wind load. Frame 663 is held by bottom cord 664. Envelope 662 encompasses reflector 651 and receiver 652.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The embodiments described are representative of but do not limit the scope of the invention.

The invention claimed is:

1. A radiant energy trap comprising:
   a reflector and receiver,
   wherein the reflector comprises at least three transverse curved sections, each having a different curvature,
   the receiver is positioned to be incident with radiant energy reflected off each reflector curved section,
   the radiant energy reflected off each reflector curved section comprises an angle of acceptance corresponding to the curvature of that section,
   and the receiver comprises multiple contiguous longitudinal planes.

2. The radiant energy trap of claim 1, wherein the receiver comprises a longitudinal duct.

3. The radiant energy trap of claim 2, wherein the longitudinal duct is positioned so that there is a gap between the reflector and the receiver.

4. The radiant energy trap of claim 2, wherein the receiver comprises a transverse cross-sectional perimeter, the longitudinal duct comprises a transverse cross-sectional edge length, and the longitudinal duct's transverse cross-sectional edge length is longer than the receiver's transverse cross-sectional perimeter.

5. A radiant energy trap comprising:
   a reflector, receiver, frame, a first and second cord, and envelope,
   wherein the reflector comprises at least one curved section,
   the receiver is positioned orthogonally adjacent to the reflector,
   the envelope encompasses the frame, reflector and receiver,
   the reflector and receiver are collapsible,
   the frame supports the envelope,
   the frame is foldable,
   the frame comprises a first and second bottom end at opposite sides of the bottom of the frame,
   the first cord is attached to the first bottom end of the frame and detachable from the second bottom end of the frame, and
   the second cord secures the reflector and receiver.

6. The radiant energy trap of claim 1, wherein the reflector comprises a first parabolic section, a second upper circular section, and a third lower circular section.

7. The radiant energy trap of claim 1, wherein the reflector comprises a first upper parabolic section, a second circular section, and a third lower parabolic section.

8. The radiant energy trap of claim 1, wherein the reflector comprises a first section comprising an arc of an angle of acceptance of light reaching the reflector and reflected to the receiver, from above the horizontal and arcs away from the horizontal, a second circular section, and a third parabolic section.

9. The radiant energy trap of claim 1, wherein the reflector comprises a first parabolic section, a second circular section, and a third section comprising an arc of an angle of acceptance of light reaching the reflector and reflected to the receiver, from above the horizontal and arcs towards the horizontal.

* * * * *